United States Patent
Henderson et al.

(10) Patent No.: US 12,208,458 B2
(45) Date of Patent: Jan. 28, 2025

(54) ROTATING TOOL HEAD

(71) Applicant: Progress Rail Services Corporation, Albertville, AL (US)

(72) Inventors: Connor Henderson, Benton, AL (US); Robin J. Intagliata, Kennesaw, GA (US)

(73) Assignee: Progress Rail Services Corporation, Albertville, AL (US)

( * ) Notice: Subject to any disclaimer, the term of this patent is extended or adjusted under 35 U.S.C. 154(b) by 467 days.

(21) Appl. No.: 17/410,649

(22) Filed: Aug. 24, 2021

(65) Prior Publication Data
US 2023/0063627 A1   Mar. 2, 2023

(51) Int. Cl.
*B23D 47/12* (2006.01)
*A01G 23/091* (2006.01)
*B26D 5/04* (2006.01)

(52) U.S. Cl.
CPC .......... *B23D 47/12* (2013.01); *A01G 23/091* (2013.01); *B26D 5/04* (2013.01)

(58) Field of Classification Search
CPC ........ A01G 23/091; B23D 47/12; B26D 5/04; B26D 5/12
USPC .......... 285/273, 278, 280, 275; 173/218, 222
See application file for complete search history.

(56) References Cited

U.S. PATENT DOCUMENTS

| | | | |
|---|---|---|---|
| 3,590,894 A | 7/1971 | Boyd et al. | |
| 3,903,973 A * | 9/1975 | Leyrat | E21B 3/022 173/218 |
| 5,390,715 A | 2/1995 | Luscombe | |
| 5,435,607 A * | 7/1995 | Everett | F16L 39/04 285/121.5 |
| 5,501,257 A * | 3/1996 | Hickman | A01G 23/091 144/34.1 |
| 5,954,105 A * | 9/1999 | Smith | A01G 23/095 144/34.1 |
| 6,408,906 B1 | 6/2002 | Moon et al. | |
| 9,603,314 B2 | 3/2017 | Voss | |
| 9,790,967 B2 * | 10/2017 | Schmotter | F15B 15/20 |
| 10,161,424 B2 * | 12/2018 | Bohner | F15B 13/022 |
| 11,058,064 B2 * | 7/2021 | Combs, III | A01B 63/02 |

FOREIGN PATENT DOCUMENTS

| | | |
|---|---|---|
| DE | 202016105380 U1 | 10/2016 |
| EP | 1160062 A3 | 11/2003 |
| KR | 100912356 B1 | 8/2009 |
| WO | 2020089335 A1 | 5/2020 |

* cited by examiner

*Primary Examiner* — Evan H MacFarlane

(57) ABSTRACT

A tool head has a frame, a tool connected to the frame, an inner rotation manifold connected to the frame, a rotation motor that rotates a spindle, and an outer rotation manifold surrounding the inner rotation manifold. The outer rotation manifold is connected to the rotation motor in a fixed manner. The spindle continuously rotates the inner rotation manifold inside of the outer rotation manifold around an axis of the inner rotation manifold, and the frame and tool are rotated with inner rotation manifold.

19 Claims, 11 Drawing Sheets

ROTATING TOOL HEAD

TECHNICAL FIELD

The present disclosure generally relates to a tool head, and more particularly, the present disclosure pertains to a tool head used for rotating a tool.

BACKGROUND

In the forestry, construction, and transmission line industries, wheeled and tracked, or grounded, work machines may be utilized to harvest or remove standing trees, repair and maintenance electrical and telecommunications lines, or in aiding in a construction operation. Tool heads may be mounted to the work machines, for example, to a boom arm, which have one or more tools. The tool head may be driven by a fluid system of the work machine such that the tool is powered. The powered tool may be rotated by the tool head to allow the tool modify features of its surrounding environment.

U.S. Pat. No. 9,603,314 discloses a truck for tree limb removal in which a feller buncher tool is attached to the end of a boom. The feller buncher tool is connected to the end of an extension arm at a join and a rotator which are disposed in series with one another. The rotator enables 360-degree rotation of the feller bunch tool about the connected end of the joint when the tool is empty to position the tool, or when a limb or other tree portion is grasped by the tool.

While effective, there remains a need for improved tool heads for work machines used in high wear applications, such as forestry or construction.

SUMMARY

In accordance with the present disclosure, a tool head is disclosed. The tool head has a frame, a tool connected to the frame, an inner rotation manifold connected to the frame, a rotation motor that rotates a spindle, and an outer rotation manifold surrounding the inner rotation manifold. The outer rotation manifold is connected to the rotation motor in a fixed manner. The spindle continuously rotates the inner rotation manifold inside of the outer rotation manifold around an axis of the inner rotation manifold, and the frame and tool are rotated with inner rotation manifold.

In accordance with another aspect of the present disclosure, a work machine is disclosed. The work machine includes a fluid system connected to a work machine frame, an engine connected to the work machine frame for driving the fluid system, and a boom supporting one or more fluid lines that are connected to the fluid system. The work machine further includes a tool head connected to the boom. The tool head has a frame, a tool connected to the frame, an inner rotation manifold connected to the frame, a rotation motor that rotates a spindle, and an outer rotation manifold surrounding the inner rotation manifold. The outer rotation manifold is connected to the rotation motor in a fixed manner. The spindle continuously rotates the inner rotation manifold inside of the outer rotation manifold around an axis of the inner rotation manifold, and the frame and tool are rotated with inner rotation manifold.

In accordance with a further aspect of the present disclosure, a method of rotating a tool with a tool head is disclosed. The method includes providing the tool head having a frame, the tool connected to the frame, an inner rotation manifold connected to the frame, a rotation motor configured to rotate a spindle, and an outer rotation manifold surrounding the inner rotation manifold. The outer rotation manifold is connected to the rotation motor in a fixed manner. The method further includes powering the rotation motor by a fluid, continuously rotating the inner rotation manifold inside of the outer rotation manifold around an axis of the inner rotation manifold with the spindle, and rotating the frame and tool with the inner rotation manifold.

These and other aspects and features of the present disclosure will be more readily understood when read in conjunction with the accompanying drawings.

DETAILED DESCRIPTION

Figure 1:
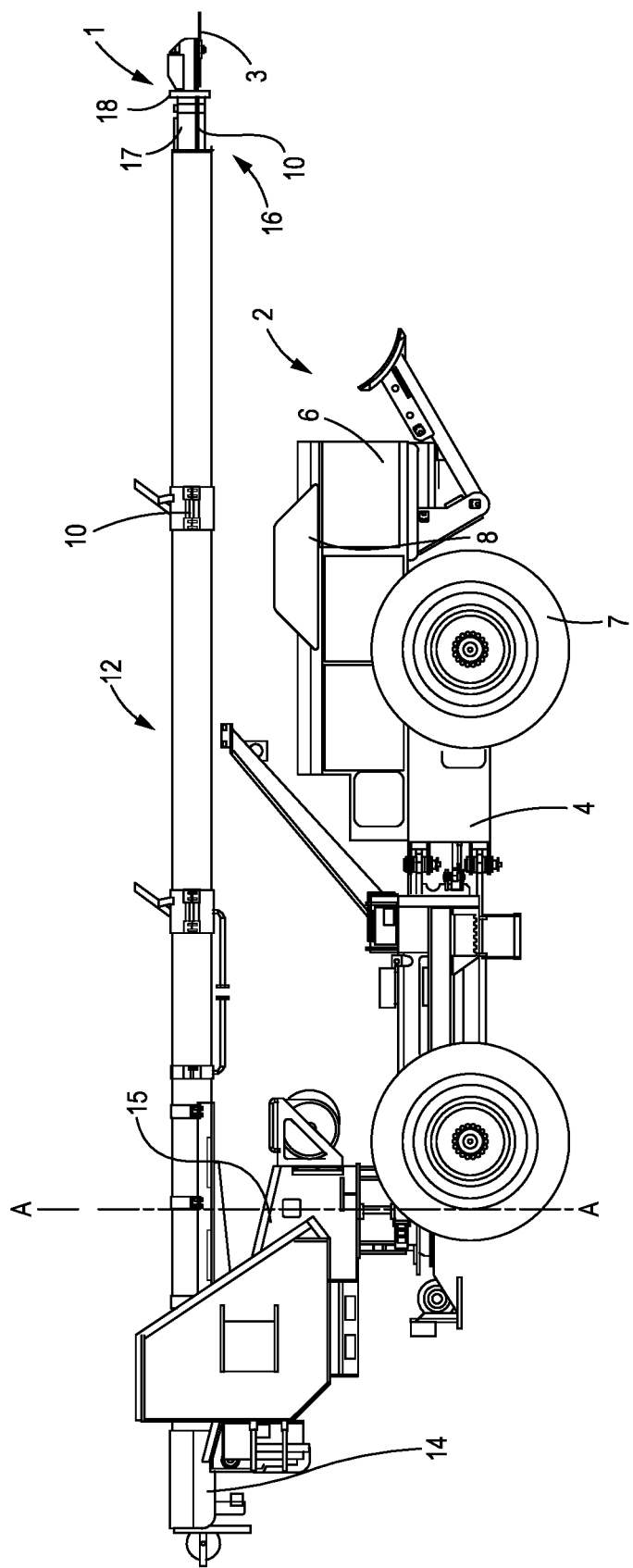
FIG. 1 is a side view of an exemplary work machine having a tool head, in accordance with the present disclosure.

Referring to FIGS. 1, a tool head 1, is attached to a work machine 2. The work machine 2 may embody a fixed or mobile machine that performs some type of operation associated with an industry such as forestry, transmission lines, construction, farming, transportation, or any other industry known in the art. For example, the work machine 2 may be a such as a forestry machine, or an excavator, truck, a tractor, a dozer, a loader, or any other construction machine.

The work machine 2 generally includes a work machine frame 4, an engine 6 supported by the work machine frame 4, and ground engaging elements 7 supporting the work machine frame 4 and driven by the engine 6. The ground engaging elements 7 may be wheels, as shown, or any other similar device such as tracks. The work machine frame 4 can include a cab 8 in which an operator utilizes a plurality of controls (e.g. joysticks, pedals, buttons, screen etc.) (not shown) for controlling the work machine 2. The engine 6 may be an internal combustion engine, such as a gasoline or diesel engine, or may be an electric motor, and provides power for operating the components associated with the work machine 2.

The work machine 2 also supports a fluid system (not shown) which can be powered from the engine 6 of the work machine 2. The fluid system can be used to power and cause actuation of many of the components that are described below, for example, fluidly powering the tool head 1 via fluid lines 10 for the rotation of a tool 3. The fluid used by the fluid system to power the rotation motor (discussed below), or the tool 3, may be any incompressible or compressible fluid. For example, a hydraulic fluid, water, air, or any other fluid may be used.

Notably, the work machine 2 includes a boom 12 that supports the tool head 1. The boom 12 extends from an attachment end 14 attached to the work machine frame 4 at an attachment joint 15 and a tool supporting end 16 that supports the tool head 1. In one exemplary embodiment, the tool head 1 is connected to a boom arm 17. The boom arm may be telescopically extendable for extending the length of the boom 12. The boom 12 may be hinged or pivotable relative to the base frame 4. The attachment joint 15 accommodates the rotation of the boom 12 about a generally vertical axis A-A.

Fluid lines 10 extend up along, or inside of, the boom 12 to the tool head 1. These fluid lines 10 can potentially be run through the interior of some or all of the boom 12 or be exposed to the exterior of the boom 12.

At the tool supporting end 16 of the boom 12, the tool head 1 is supported. The tool head 1 is affixed at the end of a boom 12 into a boom joint 18, which supports the tool head 1 and attaches the tool head 1 to the boom 12.

Figure 2:
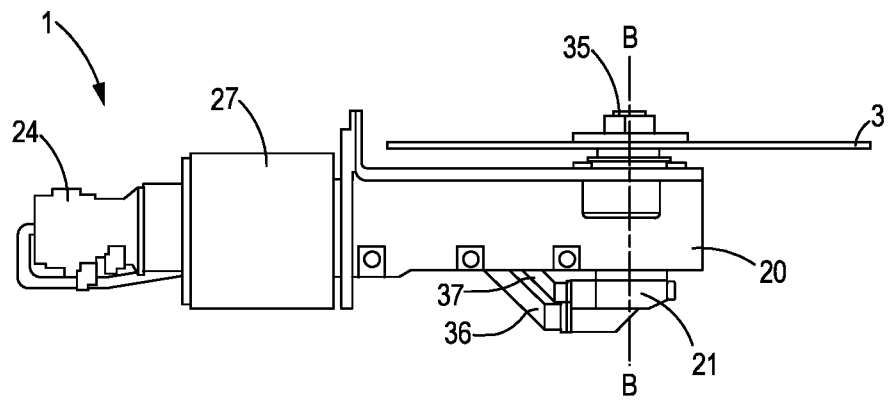
FIG. 2 is a top view of the exemplary tool head of FIG. 1, in accordance with the present disclosure.
Figure 3:
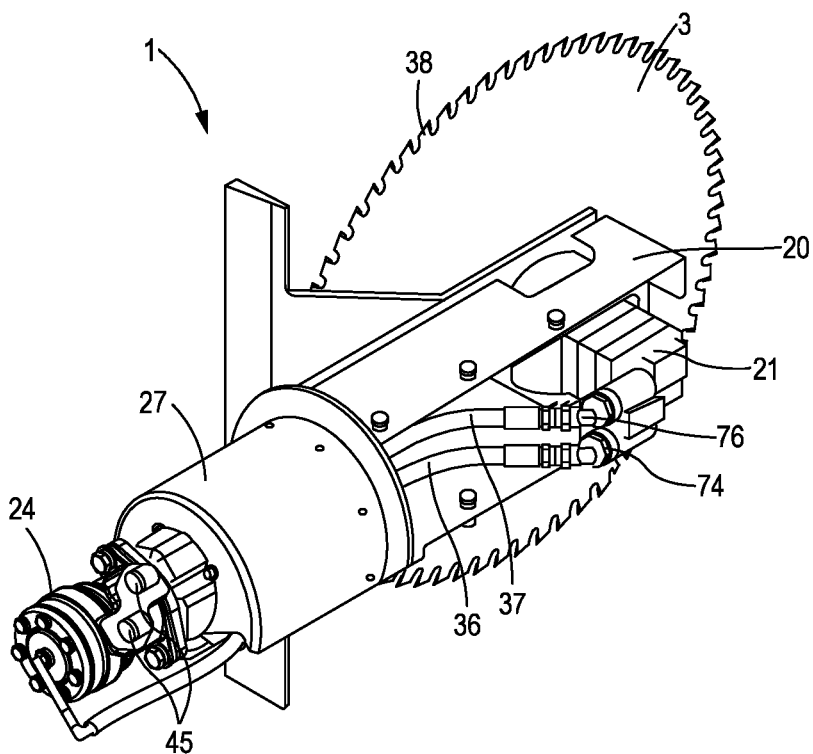
FIG. 3 is a perspective side view of the tool head of FIG. 1, in accordance with the present disclosure.
Figure 4:
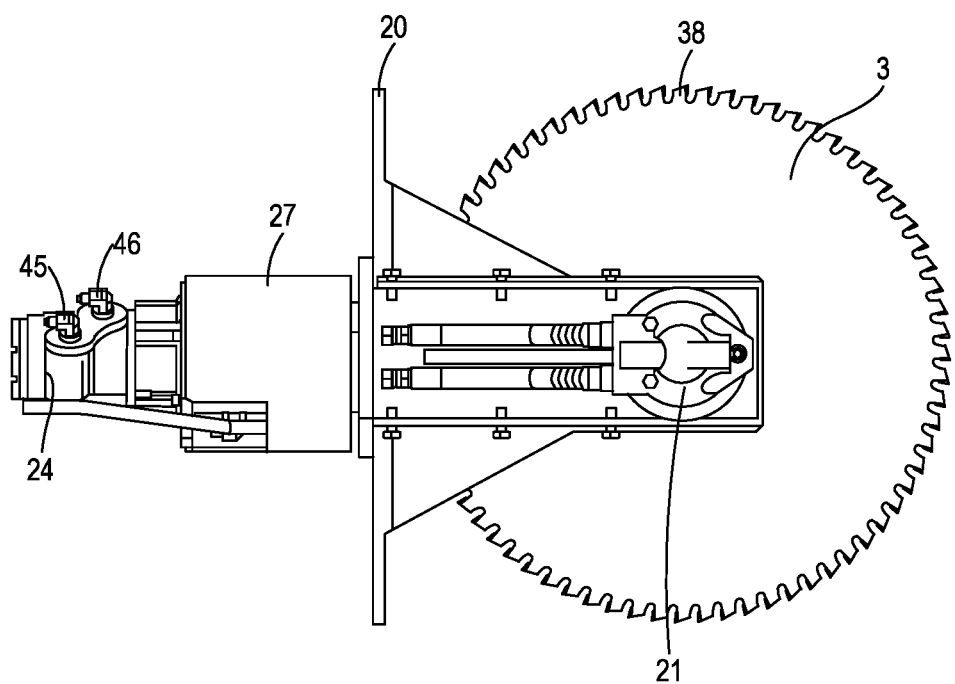
FIG. 4 is a side view of the tool head of FIG. 1, in accordance with the present disclosure.

As best shown in FIGS. 2-4, an exemplary embodiment of a tool head 1 for the work machine 2 is shown. In this embodiment, the tool head may include a frame 20, a tool motor 21 connected to the frame 20 and configured to drive a tool 3, such as a rotational saw blade as shown in FIGS. 2-4, about a saw blade axis B-B, a housing 27 surrounding an outer rotation manifold 25 (best shown in FIG. 8), an inner rotation manifold 22 having a center bore 23 (best shown in FIG. 8), a rotation motor 24, and a shaft 26 (best shown in FIGS. 6-8) located in the center bore 23 and connected to the rotation motor 24 and to the frame 20.

Figure 6:
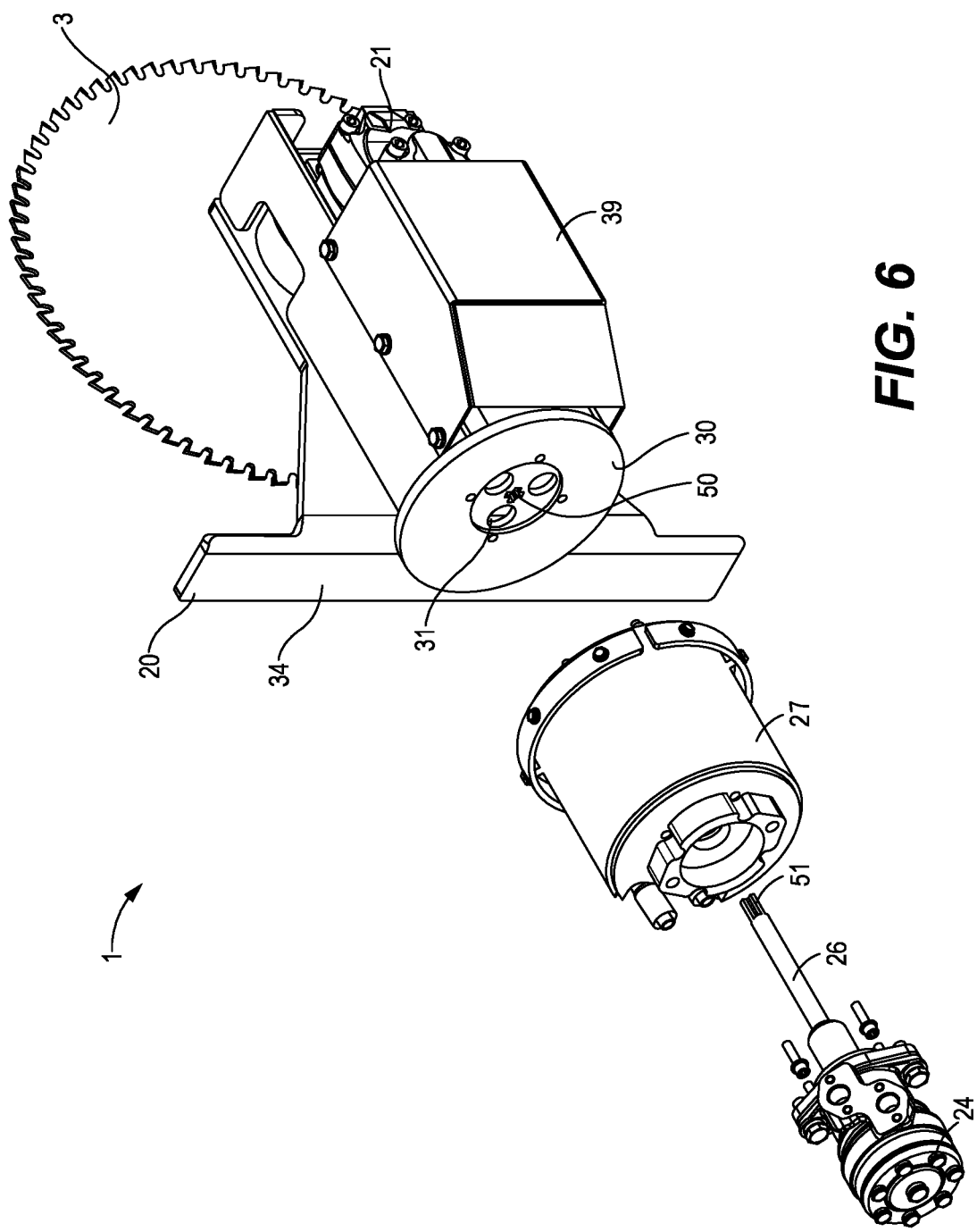
FIG. 6 is an exploded view of the tool head of FIG. 1, in accordance with the present disclosure.
Figure 7:
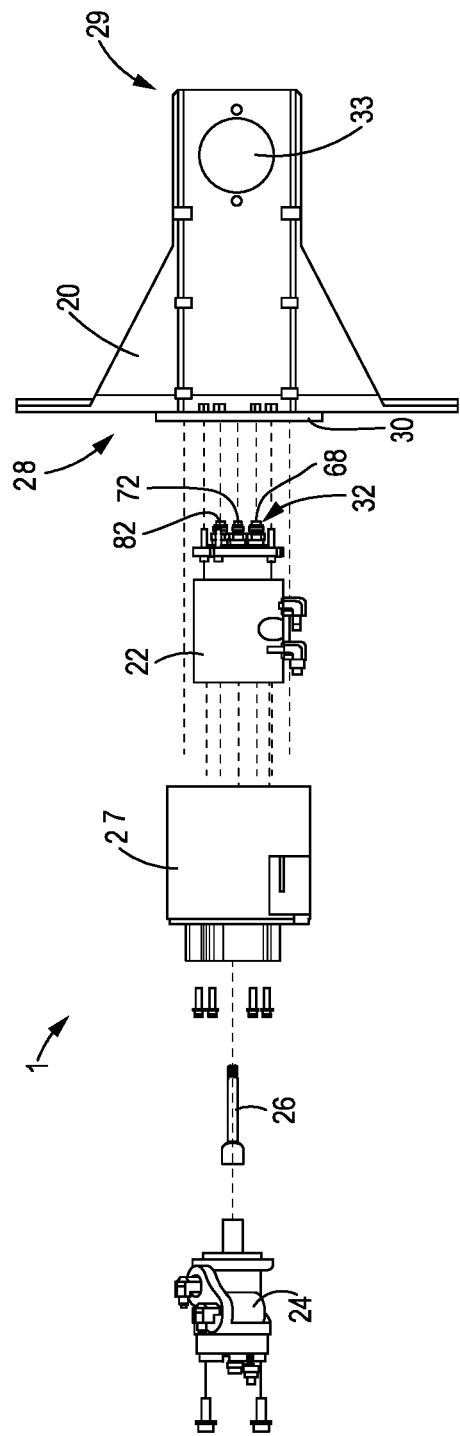
FIG. 7 is an exploded view of the tool head of FIG. 1, in accordance with the present disclosure.
Figure 8:
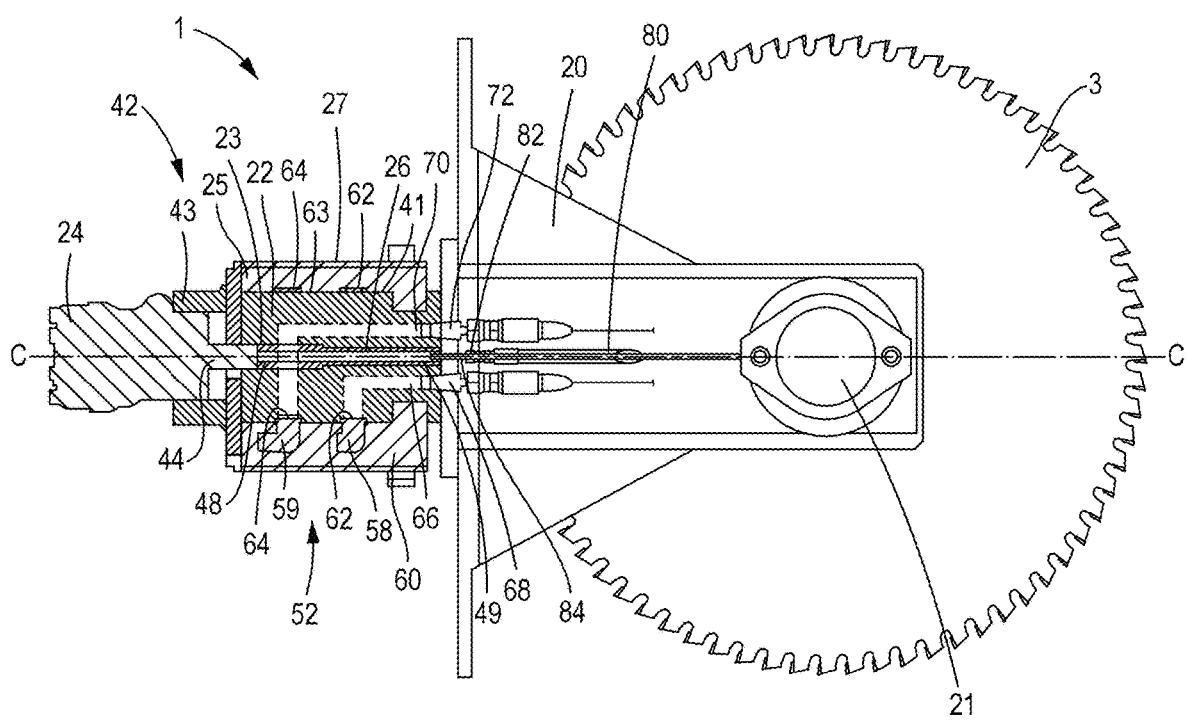
FIG. 8 is a sectional view showing inside of the housing and an inner and an outer rotation manifold of the tool head of FIG. 1, in accordance with the present disclosure.

As shown in FIG. 7, the frame 20 may be a metal frame, or any other material used in the construction of a tool head. In the illustrated exemplary embodiment, the frame includes a frame first end 28 and a frame second end 29. The frame first end 28 includes a connection plate 30 for connection of the frame 20 to the inner rotation manifold 22 (FIG. 8). As best shown in FIG. 6, the connection plate 30 may include one or more apertures 31 to allow connection of the frame 20 to the inner rotation manifold 22 (FIG. 8), and specifically, may include one or more apertures 31 that align with one or more connection pins 32 of the inner rotation manifold 22. The connection pins 32 can be screws, bolts, rivets, welded pins, or any other attachment means known in the art. As shown below in the FIG. 8 exemplary embodiment, the connections pins are shown to be part of inner rotation manifold 22 and used for the flowing of fluid. Referring back to FIG. 7, specifically, the frame second end 29, a tool motor aperture 33 is present for connecting the frame 20 to the tool motor 21. The frame may further include a protection guard 34, as shown in FIG. 6, for protecting the tool head 1, boom 12, and any fluid lines, such as fluid lines 10, by blocking debris during the operation of the tool 3.

The tool motor 21, as best shown in FIG. 2, is connected to the frame 20 at the tool motor aperture 33. The tool motor 21, in the illustrated exemplary embodiment, is configured to be fluidly driven to rotate a tool motor spindle 35. In the exemplary embodiment, fluid passes through an inlet hose 36, rotates a turbine (not shown) inside of the tool motor 21, and exits the tool motor through an outlet hose 37. The rotation of the turbine rotates the attached tool motor spindle 35, which rotates the saw blade 3 that is attached to the tool motor spindle 35. The placement of the inlet hose 36 and the outlet hose 37 in FIG. 2 is shown for exemplary purposes, and their placement may be reversed. Further, in another exemplary embodiment, the flow of the fluid may be reversed to rotate the saw blade 3 in an opposite direction along the saw blade axis B-B. In FIG. 6, a tool motor 21 and inlet hose 36 and outlet hose 37 and a protection cover 39 are shown connected to the frame. The protection cover 39 may, partially, or in another exemplary embodiment, completely, cover the inlet hose 36 and outlet hose 37 and tool motor 21 to protect them from debris during operation of the tool 3. The protection cover may further include apertures (not shown) to allow for cooling of the tool motor 21, fluid hoses, or any tool 3 connected to the frame 20.

The tool 3 may be a rotating circular saw blade, as shown in the figures, but may be a reciprocating saw or shears in another exemplary embodiment. In a further exemplary embodiment, the tool 3 may be any tool known to be connected to a tool head. The tool 3 may be a metal saw blade, or constructed of any other materials commonly used to make a circular saw blade. As shown best in FIG. 3, the saw blade 3 includes a plurality of peripheral teeth 38 for sawing the trunk of a tree, tree branch, vegetation, transmission line or pole, or used in the construction industry.

As shown in FIGS. 2-7, the housing 27 may engage and surrounds the outer rotation manifold 25. As shown, the housing is cylindrical in shape, and is used to attach the tool head 1 to the end of the boom 12. In one embodiment, the outside surface of the of the housing 27 is smooth, or splined, and is adapted to fit into the boom joint 18, or configured to be fitted onto the end of the boom 12. As best shown in FIG. 8, the housing 27 surrounds, is connected to, or engages the outer rotation manifold 25. At a front end 42 of the housing, the housing 27 includes a rotation motor attachment 43 for attaching the housing 27 to the rotation motor 24. In the FIG. 8 exemplary embodiment, the housing 27 is fixedly connected to the rotation motor 24. Fixedly connected means connected so as to not rotate when the rotation motor rotates the spindle 44. The rotation motor attachment 43, in the illustrated embodiment, is a circular aperture allowing for insertion of the rotation motor 24 without interference of a rotation motor spindle 44.

Further, FIG. 8 depicts the rotation motor 24, which is attached to the housing 27. The rotation motor 24 drives the rotation motor spindle 44, and the shaft 26 connected to the rotation motor spindle 44, about an axis of the inner rotation manifold C-C. In one exemplary embodiment, the rotation motor is fluidly driven. In this embodiment, best shown in FIG. 3, the rotation motor 24 includes a rotation motor inlet port 45 and a rotation motor outlet port 46. Fluid lines, such as fluid lines 10, are connected to the rotation motor inlet port 45 to flow fluid into the rotation motor inlet port 45, the fluid rotating a turbine (not shown) inside of the rotation motor 24 to drive the rotation of the rotation motor spindle 44, and the fluid flowing out of the rotation motor outlet port 46. Similarly, to the tool motor 21, the pressure or flow speed of the fluid can be adjusted to increase or decrease the rotation speed of the rotation motor spindle 44. In a further exemplary embodiment, the rotation motor is an electric motor.

Also shown in FIG. 8, the shaft 26 is connected to the rotation motor spindle 44 at a shaft first end 48, and passes through the center bore 23 to connect at a shaft second end 49 to the frame 20 at a shaft connection point 50 (FIG. 6). The shaft first end 48 may have a larger diameter than the shaft second end 49 to allow for connection of the shaft 26 around, or in one exemplary embodiment, to the end of, the rotation motor spindle 44. At the shaft second end 49, as shown in FIG. 6, the shaft second end 49 has a connection head 51 for insertion, or attachment to, the shaft connection point 50. The connection head 51 may be cross-shaped for fitting into a cross-shaped shaft connection point 50, but in other exemplary embodiments, may be flat for welding to, or any shape suitable for connecting the shaft 26 to the connection point 50. The shaft connection point 50 may be cross-shaped, circular, flat, or any shape suitable for connecting to the shaft 26. Thus, as the spindle 44 of the rotation motor 24 drives rotation of the shaft 26, the connected frame 20 rotates about the axis of the inner rotation manifold C-C with the shaft 26, while the housing 27, and the outer rotation manifold 25, stay stationary with respect to the rotation motor 24. The components attached to the frame 20 are also rotated about the axis of the inner rotation manifold C-C with the frame 20, including the tool motor 21, saw blade 3, and the inlet and outlet hoses 36, 37. The rotation motor 24 is configured to continuously rotation the shaft 26 about the axis of the inner rotation manifold C-C in a clockwise or counterclockwise direction.

Figure 5:
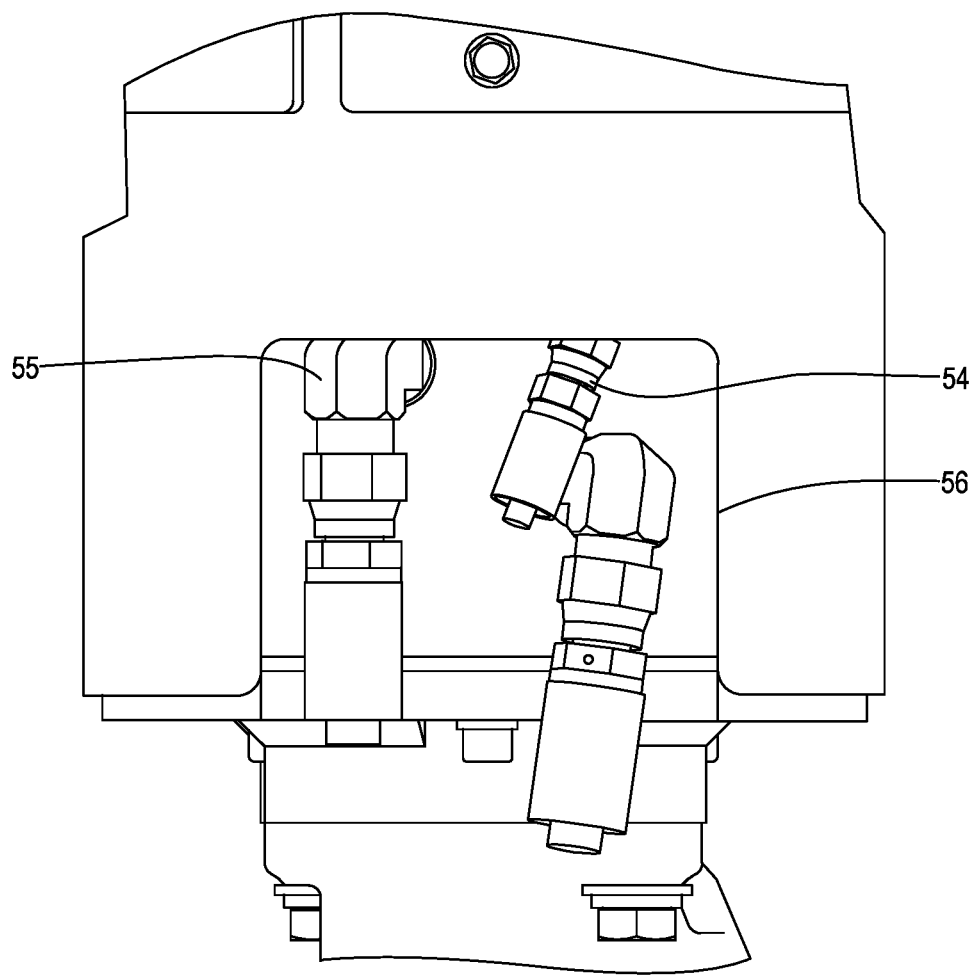
FIG. 5 is a partial view of the tool head of FIG. 1 showing a housing of the tool head, in accordance with the present disclosure.

In one exemplary embodiment, the inner rotation manifold 22 and the outer rotation manifold 25 form a rotary union 52. In this embodiment, the outer rotation manifold 25 includes an inlet port 54 and an outlet port 55. As shown in FIG. 5, the housing 27 may include a housing cutout 56 to allow for the inlet port 54 and the outlet port 55 to be connected to the fluid lines, such as fluid lines 10. Referring back to FIG. 8, the inlet port 54 may be connected to a first wall bore 58 and the outlet port 55 may be connected to a second wall bore 59, with the first and second housing wall bores 58, 59 being located in an outer rotation manifold wall 60. The inner rotation manifold 22 may further include an inlet groove 62, that supports the flow of the fluid around the inner rotation manifold 22, in fluid communication with the first wall bore 58 and is circumferentially disposed on the inner rotation manifold 22 between the inner surface 41 of the outer rotation manifold 25 and an external surface 63 of the inner rotation manifold 22. Further, the inner rotation manifold 22 may include an outlet groove 64, that supports the flow of the fluid around the inner rotation manifold 22, in fluid communication with the second wall bore 59 and is circumferentially disposed on the inner rotation manifold 22 between the inner surface 41 of the outer rotation manifold 25 and an external surface 63 of the inner rotation manifold 22. A first channel 66 inside of the wall of the inner rotation manifold 22 fluidly connects the inlet groove 62 to an inner rotation manifold outlet 68, and a second channel 70 fluidly connects the outlet groove 64 to an inner rotation manifold inlet 72. The inner rotation manifold outlet 68 and the inner rotation manifold inlet 72 rotate with the inner rotation manifold 22, and thus, the shaft 26, and the first wall bore 58 and the second wall bore 59 are stationary with the housing 25 as the shaft 26 rotates. The connection pins 32 discussed above, in one exemplary embodiment, also serve as the inner rotation manifold outlet 68 and the inner rotation manifold inlet 72. Further, the inlet hose 36 is in fluid communication with the inner rotation manifold outlet 68 and a tool motor inlet 74 (FIG. 3), and the outlet hose 37 is in fluid communication with the inner rotation manifold outlet 72 and a tool motor outlet 76 (FIG. 3).

Further the shaft 26 may be hollow, and an electric cable 84 can travel from the rotation motor 24, through the hollow shaft 26, and through a conduit 80 to the tool motor 21, or any attached tool 3. The conduit 80 may be connected to the tool motor 21 and pass through one of the apertures 31 of the frame 20 to connect to a center shaft output 82. In one exemplary embodiment, the electric cable does not rotate as the shaft 26 and conduit 80 rotate around it. The electric cable is terminated at an annular electric connector at the tool motor that allows non-limiting rotation at the connector.

In one exemplary embodiment, the direction of the fluid may be reversed, and the designation of the above mentioned inlet hose, rotation motor inlet port, inlet port, first wall bore, inlet groove, first channel, inner rotation manifold outlet, tool motor inlet, may be change their named designation with their corresponding outlet hose, rotation motor outlet port, outlet port, second wall bore, outlet groove, second channel, inner rotation manifold inlet, and tool motor outlet, and vice versa. Thus, depending on the flow of the fluid, and desired rotation direction of the saw or saw blade, the flow of the hydraulic fluid through components of the tool head 1 determines the named designation of these listed components, and any designation presented above is meant to show one direction of fluid flow, which may be reversed, and is meant to be non-limiting.

Figure 9:
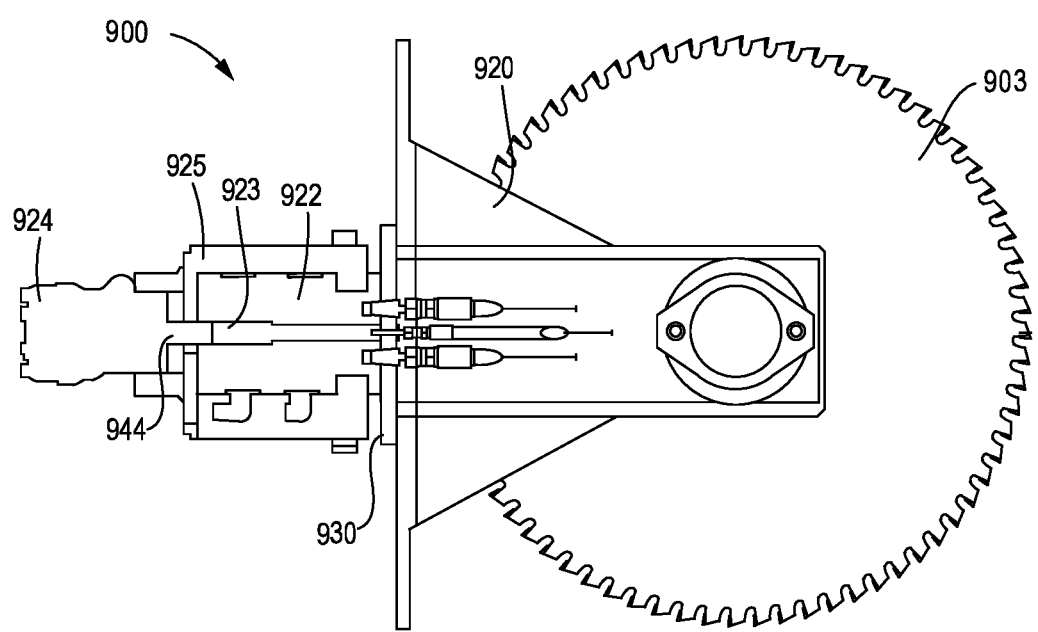
FIG. 9 is a sectional view of an exemplary tool head, in accordance with the present disclosure.

FIG. 9 depicts another exemplary embodiment of the present disclosure. In this embodiment, a tool head 900 includes a frame 920, a tool 903 connected to the frame 920, an inner rotation manifold 922 connected to the frame 920, a rotation motor 924 configured to rotate a spindle 924, and an outer rotation manifold 925 surrounding the inner rotation manifold 922, with the outer rotation manifold 925 fixedly connected to the rotation motor 924. The spindle 944 is configured rotate the inner rotation manifold 922 inside of the outer rotation manifold 925 about the axis of the inner rotation manifold C-C (FIG. 8), and the frame 920 and the tool 903 are rotated with the inner rotation manifold 922. The rotation motor 924 may continuously rotate the spindle 944, the inner rotation manifold 922 connected to the spindle 944, the frame 920 connected to the inner rotation manifold 922, and the tool 903 connected to the frame 920, about axis of the inner rotation manifold 922 in a clockwise or counterclockwise manner. Further, to allow for a better angle of the tool, for example, if the tool 903 is a circular saw blade as shown in FIG. 9, the rotation motor 924 may selectively rotate the tool 903 in either direction continuously to obtain a specific degree in its infinite range of rotation capabilities. The FIG. 9 embodiment differs from the FIG. 2-8 embodiment, as it does not have a shaft. The inner rotation manifold 922 is directly connected to a connection plate 930 of the frame 920, and the spindle 944 is directly connected to a center bore 923 of the inner rotation manifold 922. However, the FIG. 9 inner rotation manifold 922 may contain the elements of the inner rotation manifold 22 listed above, including the grooves, channels, wall bores, inlet, outlets, etc. In the FIG. 9 exemplary embodiment, the outer rotation manifold does not have a housing, and is directly connected to the rotation motor 924. However, in another exemplary embodiment, a housing surrounds, and is fixedly connected to, the outer rotation manifold 925. In this embodiment, the housing is fixedly connected to the rotation motor 924.

Figure 10:
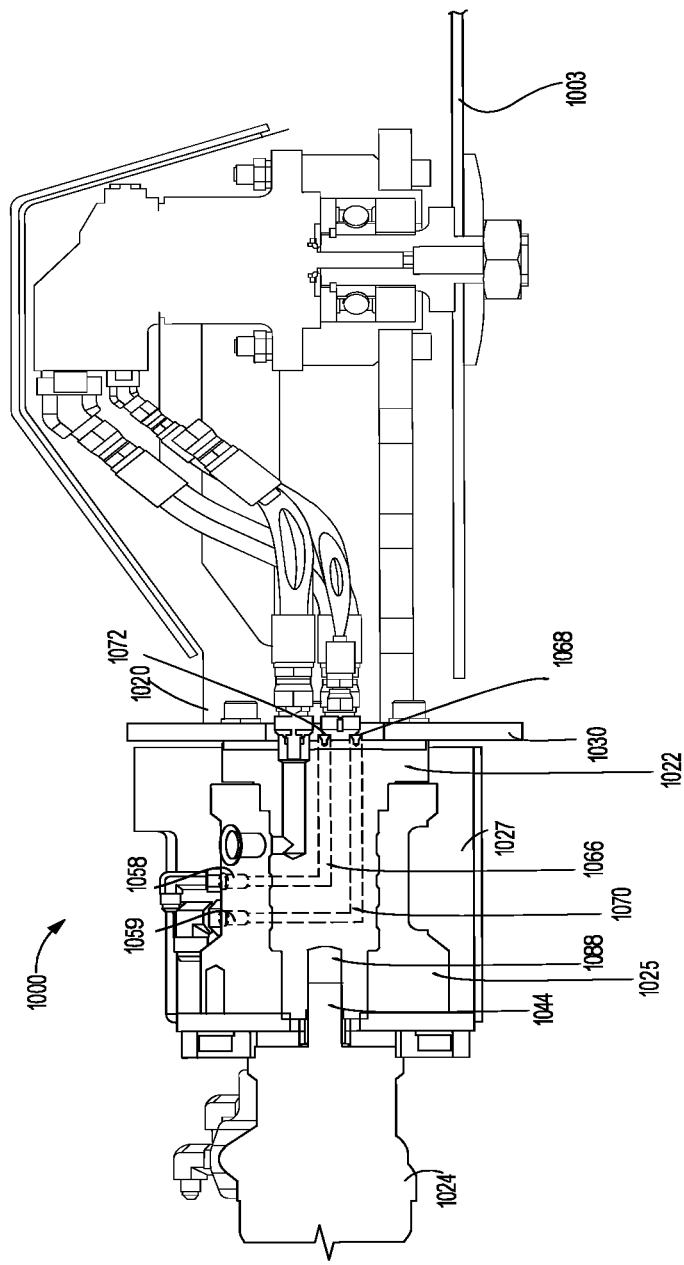
FIG. 10 is a top sectional view of an exemplary tool head, in accordance with the present disclosure.

In another exemplary embodiment, shown in FIG. 10, a rotation motor 1024 is directly connected to an inner rotation manifold 1024, and the inner rotation manifold 1022 is directly connected to the frame 1020. An outer rotation manifold 1025 surrounds the inner rotation manifold 1022, and the outer rotation manifold is fixedly connected to a housing 1027. The housing 1027 is fixedly connected to the rotation motor 1024. The rotation motor 1024 can continuously rotate a spindle 1044 of the rotation motor 360 degrees, clockwise or counterclockwise. The inner rotation manifold 1022, connected to the spindle 1044, rotates with the spindle 1044 inside of the outer rotation manifold 1025. The frame 1020, connected to the inner rotation manifold 1022, rotates with the inner rotation manifold 1022. The spindle 1044 may have a splined tip 1088 for rotating the inner rotation manifold 1022.

Figure 11:
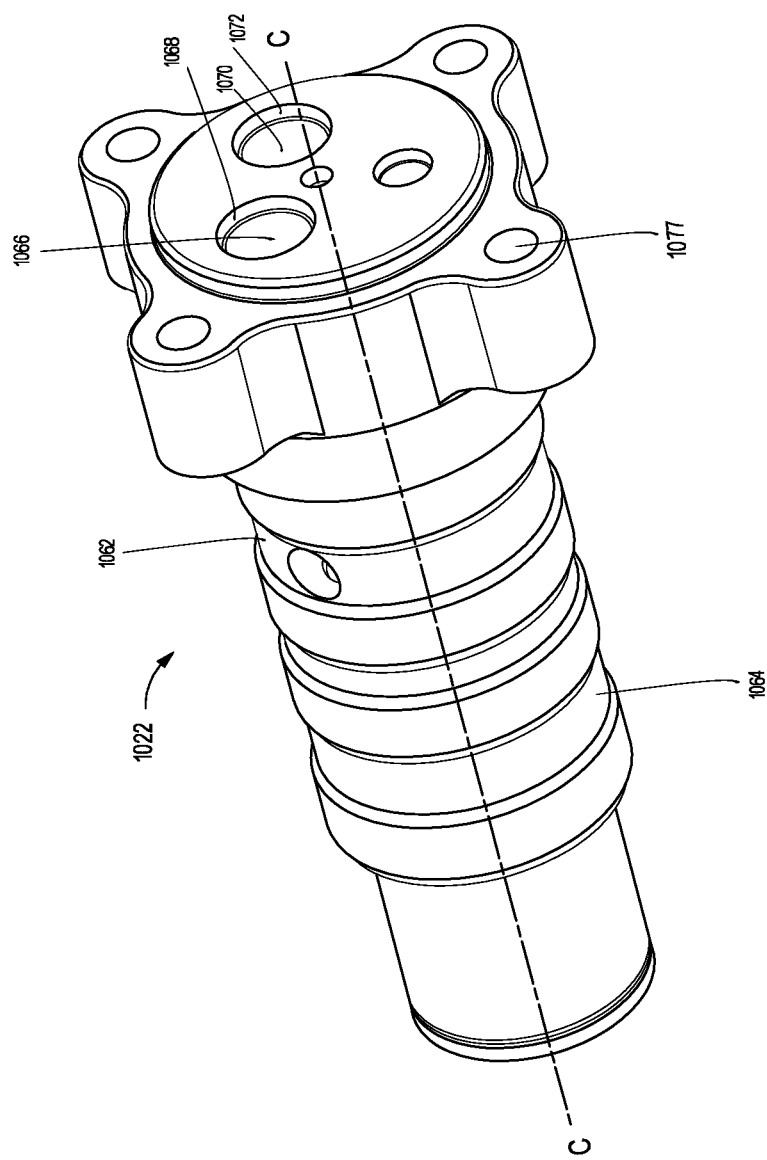
FIG. 11 is a perspective view of an exemplary inner rotation manifold of the tool head of FIG. 10, in accordance with the present disclosure.

Referring to FIGS. 10-11, the inner rotation manifold 1022 has one or more apertures 1077 for connecting to the frame 1022 by bolt, screw, riveting, or any other securing means. The outer rotation manifold, best shown in FIG. 10, has a first wall bore 1058 and a second wall bore 1059 that both remain stationary during the rotation of the inner rotation manifold 1022. As shown in FIG. 9, the inner rotation manifold 1022 has an inlet groove 1062 in fluid communication with the first wall bore 1058, and is circumferentially disposed on the inner rotation manifold 1022. The inlet groove supports the flow of the fluid between the inner rotation manifold 1022 and the outer rotation manifold 1025. The inner rotation manifold 1022 has an outlet groove 1064 in fluid communication with the second wall bore 1059 and is circumferentially disposed on the inner rotation manifold 1022. The outlet groove 1064 supports the flow of the fluid between the inner rotation manifold 1022 and the outer rotation manifold 1025. The inner rotation manifold 1022 further has a first channel 1066 fluidly connecting the inlet groove 1062 to an inner rotation manifold outlet 1072, and a second channel 1070 fluidly connecting the outlet groove 1064 to an inner rotation manifold inlet 1068. The inner rotation manifold inlet 1068 and the inner rotation manifold outlet 1072 rotate with the inner rotation manifold 1022, allowing a fluid to pass through the inner rotation manifold 1022 and power a tool 1003 connected to the frame 1020 without twisting any conduits during the continuous rotation of the inner rotation manifold 1022.

The inner rotation manifold 1022 may include multiple grooves, channels, wall bores, and inner rotation manifold inlets and outlets to allow for the passage of more fluid through multiple channels, allowing for more multiple inlets hoses to be connected to each inner manifold inlet, and multiple outlet hoses to be connected to each inner manifold outlet. This supports the powering of multiple tools, connected, or disconnected, to the frame.

INDUSTRIAL APPLICABILITY

In general, the teachings of the present disclosure may find applicability in many industries including, but not limited to, tool heads. More specifically, the teachings of the present disclosure may find applicability in any industry using tool heads to rotate a tool, such as, but not limited to, in the forestry, agriculture, tree removal, construction, power or communications lines industries and the like.

In accordance with the scope of the present disclosure, in one such operation it is desirable to rotate a tool in any direction without tangling fluid hoses, for example a circular saw blade, to cut a portion of a tree at a desired angle. The present disclosure provides a method for rotating a tool head.

Figure 12:
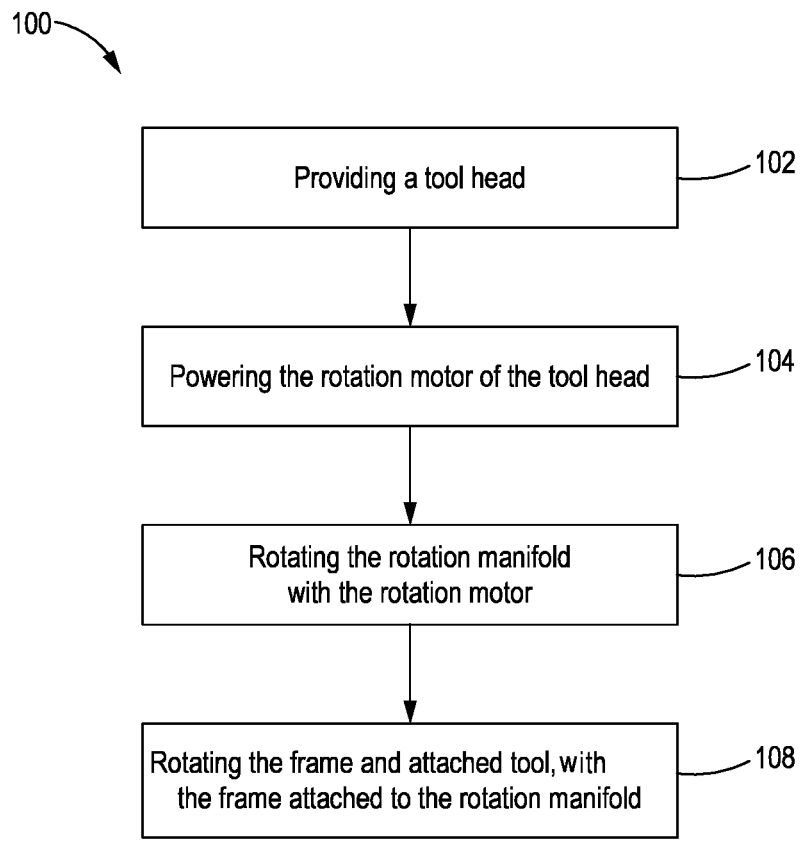
FIG. 12 is a flow chart illustrating a method of rotating a tool head.

Turning now to FIG. 12, with continued reference to FIGS. 10-11, a flowchart illustrating an exemplary method 100 for rotating a tool head. At block 102 a tool head 1000 is provided. The tool head 1000 may include a frame 1020, a tool 1003 connected to the frame 1020, an inner rotation manifold 1022 connected to the frame 1020, a rotation motor 1024, and an outer rotation manifold 1025 surrounding the inner rotation manifold 1025 and fixedly connected to rotation motor 1024. At block 104, the rotation motor 1024 is powered, either hydraulically or electrically. At block 106, the inner rotation manifold 1022 is rotated with the rotation motor 1024. At block 108, the frame 1020 with the attached tool 1003 are rotated by the attached inner rotation manifold 1022.

Further in the scope of the present disclosure, with reference to FIG. 8, during rotation of the tool head 1, fluid flows through a first wall bore 58, around an inlet groove 62, through a first channel 66, out of an inner rotation manifold outlet 68, through an inlet hose 36, and into a tool motor inlet 74. Once in the tool motor 21, the fluid spins a turbine (not shown) which drives the tool motor 21. After spinning the turbine, the hydraulic fluid flows out of the tool motor outlet 76, through an outlet hose 37, into the inner rotation manifold inlet 72, through a second channel 70, around an outlet groove 64, and out of a second wall bore 59. The flowing of the hydraulic fluid through the stationary first wall bore 58, around the inlet groove 62, and out of the inner rotation manifold outlet 68 allows for the saw blade to be driven as the rotation manifold 22 is rotated with the shaft 26.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A tool head, the tool head comprising:
a frame;
a tool connected to the frame;
an inner rotation manifold connected to the frame and including a center bore;
a rotation motor configured to rotate a spindle;
a shaft located in the center bore of the inner rotation manifold and connected to the spindle of the rotation motor and to the frame; and
an outer rotation manifold surrounding the inner rotation manifold, the outer rotation manifold fixedly connected to the rotation motor,
wherein the spindle is configured to be inserted into the center bore of the inner rotation manifold and produce a rotation of the inner rotation manifold and the shaft by continuously rotating the inner rotation manifold and the shaft inside of the outer rotation manifold about an inner manifold axis, and the frame and tool are rotated with the inner rotation manifold and the shaft.

2. The tool head of claim 1, in which a housing surrounds the outer rotation manifold, the outer rotation manifold is connected to the housing, and the housing is fixedly connected to the rotation motor.

3. The tool head of claim 1, in which the tool is a saw blade, and a tool motor is connected to the frame and configured to drive the saw blade about a saw blade axis that is perpendicular to the inner manifold axis.

4. The tool head of claim 3, wherein the rotation motor is configured to rotate the shaft about the inner manifold axis that is perpendicular to the saw blade axis, in which the frame, the inner rotation manifold, the tool motor, and the saw blade are rotated with the shaft.

5. The tool head of claim 4, further comprising an electric cable connected to the tool, wherein the shaft is hollow, and the electric cable is configured to travel through the shaft, through an aperture of the frame, and to the tool without being rotated by the inner rotation manifold.

6. The tool head of claim 5, in which the electric cable is configured to provide power to the tool and allow non-limiting rotation of the tool motor.

7. The tool head of claim 1, in which the outer rotation manifold includes a first wall bore and a second wall bore that are stationary relative to the rotation motor during the rotation of the inner rotation manifold.

8. The tool head of claim 7, in which the inner rotation manifold comprises an inlet groove in fluid communication with the first wall bore and is circumferentially disposed on the inner rotation manifold, the inlet groove configured to support a first flow of a fluid between the inner rotation manifold and the outer rotation manifold, and the inner rotation manifold comprises an outlet groove in fluid communication with the second wall bore and is circumferentially disposed on the inner rotation manifold, and the outlet groove configured to support a second flow of a fluid between the inner rotation manifold and the outer rotation manifold.

9. The tool head of claim 8, in which the inner rotation manifold includes a first channel fluidly connecting the inlet groove to an inner rotation manifold outlet, and a second channel fluidly connecting the outlet groove to an inner rotation manifold inlet, the inner rotation manifold inlet and the inner rotation manifold outlet configured to rotate with the inner rotation manifold.

10. The tool head of claim 9, in which an inlet hose is in fluid connection with the inner rotation manifold outlet and a tool motor inlet, and an outlet hose is in fluid connection the inner rotation manifold inlet and a tool motor outlet.

11. The tool head of claim 10, in which the tool comprises a saw blade, and a fluid flows through the first wall bore, around the inlet groove, through the first channel, out of the inner rotation manifold outlet, through the inlet hose, and into the tool motor inlet to drive a rotation of the saw blade before flowing out of tool motor outlet, through the outlet hose, into the inner rotation manifold inlet, through the second channel, around the outlet groove, and out of the second wall bore.

12. The tool head of claim 11, in which the inner rotation manifold rotates the frame, the tool motor, and the saw blade about the inner manifold axis as the fluid drives the rotation of the saw blade about a saw blade axis that is perpendicular to the inner manifold axis.

13. A work machine configured to cut timber, the work machine comprising:
a work machine frame;
a fluid system connected to the work machine frame;
an engine connected to the work machine frame for driving the fluid system;
a boom supporting one or more fluid lines connected to the fluid system; and
a tool head connected to the boom, the tool head further comprising:
a frame,
a tool connected to the frame,
an inner rotation manifold connected to the frame and including a center bore,
a rotation motor configured to rotate a spindle,
a shaft located in the center bore of the inner rotation manifold and connected to the spindle of the rotation motor and to the frame, and
an outer rotation manifold surrounding the inner rotation manifold, the outer rotation manifold fixedly connected to the rotation motor;
wherein the spindle is configured to be inserted into the center bore of the inner rotation manifold and produce a rotation of the inner rotation manifold and the shaft by continuously rotating the inner rotation manifold and the shaft inside of the outer rotation manifold about an inner manifold axis, and the frame and tool are rotated with the inner rotation manifold and the shaft.

14. The work machine of claim 13, in which the one or more fluid lines are connected to a rotation motor inlet port and a rotation motor outlet port, the rotation motor is driven by the fluid system, and the fluid system drives continuous rotation of the inner rotation manifold, the frame, and the tool.

15. The work machine of claim 13, in which the one or more fluid lines connect to the outer rotation manifold at an outer rotation manifold inlet port and an outer rotation manifold outlet port, and the fluid system drives rotation of the tool.

16. The work machine of claim 13, in which the inner rotation manifold has a first inner rotation manifold outlet for delivering a fluid from the inner rotation manifold to drive rotation of the tool, and a second inner rotation manifold outlet for delivering the fluid from inner rotation manifold to drive rive rotation of a second tool.

17. A method of rotating a tool with a tool head, the method comprising:
providing the tool head having a frame, a tool connected to the frame, an inner rotation manifold connected to the frame and including a center bore, a rotation motor configured to rotate a spindle to produce a rotation of the inner rotation manifold and a shaft located in the center bore of the inner rotation manifold and connected to the spindle of the rotation motor and to the frame, the tool head including an outer rotation manifold surrounding the inner rotation manifold and fixedly connected to the rotation motor;
powering the rotation motor by a fluid;
continuously rotating the inner rotation manifold and the shaft about an inner rotation manifold axis with the spindle; and
rotating the frame and tool with the inner rotation manifold and the shaft,
wherein the spindle is inserted into the center bore of the inner rotation manifold.

18. The method of claim 17, in which the rotation motor is configured to continuously rotate the inner rotation manifold in a clockwise or counterclockwise direction.

19. The method of claim 17, in which the inner rotation manifold and the outer rotation manifold form a rotary union, and a saw blade connected to the frame is configured to be driven by a tool motor connected to the frame during the continuous rotation of the inner rotation motor.

* * * * *